United States Patent [19]
Vollmer et al.

[11] Patent Number: 5,743,658
[45] Date of Patent: Apr. 28, 1998

[54] LUBRICATED JOURNAL BEARING

[75] Inventors: Angela Vollmer, Dortmund; Joachmim Meyer; Hans Marschhausen, both of Hanover; Christian Schliephack, Coppenbrugge, all of Germany

[73] Assignee: Renk Aktiengesellschaft, Augsburg, Germany

[21] Appl. No.: 573,288

[22] Filed: Dec. 15, 1995

[51] Int. Cl.$^6$ ............................ F16C 33/10; F16C 37/00
[52] U.S. Cl. ............................................. 384/406; 384/317
[58] Field of Search ............................ 384/322, 397, 384/400, 403, 404, 405, 406, 407, 317, 320, 321

[56] References Cited

U.S. PATENT DOCUMENTS

| | | | |
|---|---|---|---|
| 1,657,349 | 1/1928 | Eisenhauer | 384/404 |
| 1,684,341 | 9/1928 | Bethel | 384/393 |
| 1,759,415 | 5/1930 | Perlesz | 384/317 X |
| 2,884,284 | 4/1959 | Bohn | 384/404 |
| 3,217,656 | 11/1965 | Oakes | 384/320 X |
| 3,476,452 | 11/1969 | Hagg et al. | 384/404 |

FOREIGN PATENT DOCUMENTS

| | | |
|---|---|---|
| 535605 | 1/1992 | France . |
| 621024 | 10/1935 | Germany . |
| 533314 | 10/1951 | Germany . |
| 593766 | 9/1960 | Germany . |
| 2502805 | 7/1976 | Germany . |
| 2542947 | 5/1979 | Germany . |
| 8101822 | 1/1981 | Germany . |
| 3636539 | 5/1987 | Germany . |
| 3726751 | 2/1989 | Germany . |
| 4021053 | 2/1993 | Germany . |
| 63-259296 | 10/1988 | Japan . |
| 314309 | 3/1930 | United Kingdom . |
| 554879 | 7/1943 | United Kingdom . |
| 711777 | 7/1954 | United Kingdom . |
| 2192312 | 1/1988 | United Kingdom . |

*Primary Examiner*—Thomas R. Hannon
*Attorney, Agent, or Firm*—Natter & Natter

[57] ABSTRACT

Radial friction bearing (1), in particular for electric motors (engines), comprising a bearing housing (2), at least one fixed lubrication ring (4) which is secured on a shaft (6) coaxially with it, and at least one bearing shell (8) disposed within the bearing housing (2) in which the shaft (6) is rotatably supported and the bearing housing (2) comprises a radial joining plane (10) and the at least one bearing shell is a thin-walled bearing shell (8).

16 Claims, 6 Drawing Sheets

LUBRICATED JOURNAL BEARING

The invention relates to a radial friction bearing according to claim 1.

From prior art are known radial friction bearings with a bearing housing, a fixed lubrication ring fastened coaxially on a shaft, and at least one bearing shell disposed within the bearing housing, in which the shaft is supported.

The invention is intended for solving the task of implementing a radial friction bearing so that it can be assembled in simple manner and disassembled for service work as well as be cooled and lubricated simply as well as be produced more cost-effectively.

The task is solved according to the invention through the characterizing characteristics of claim 1.

Since the radial friction bearing has a radial mold joint and for bearing the shaft thin-walled bearing shells are used, it can be produced very cost-effectively.

In the following the invention will be described in further detail in conjunction with several embodiment examples with reference to the drawings. Therein depict.

Figure 1:
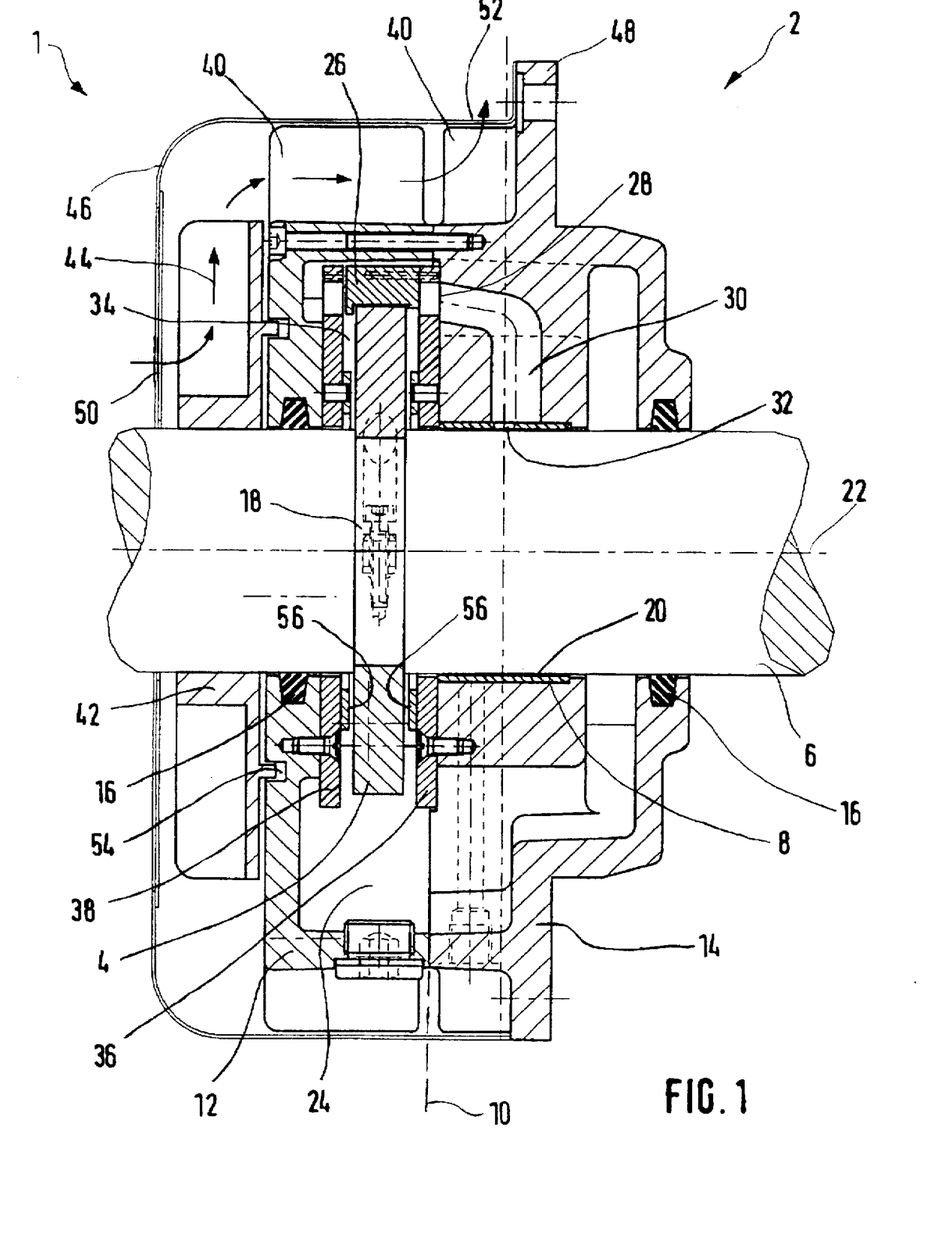
FIG. 1 an axial section of a radial friction bearing according to a first embodiment of the invention.
Figure 2:
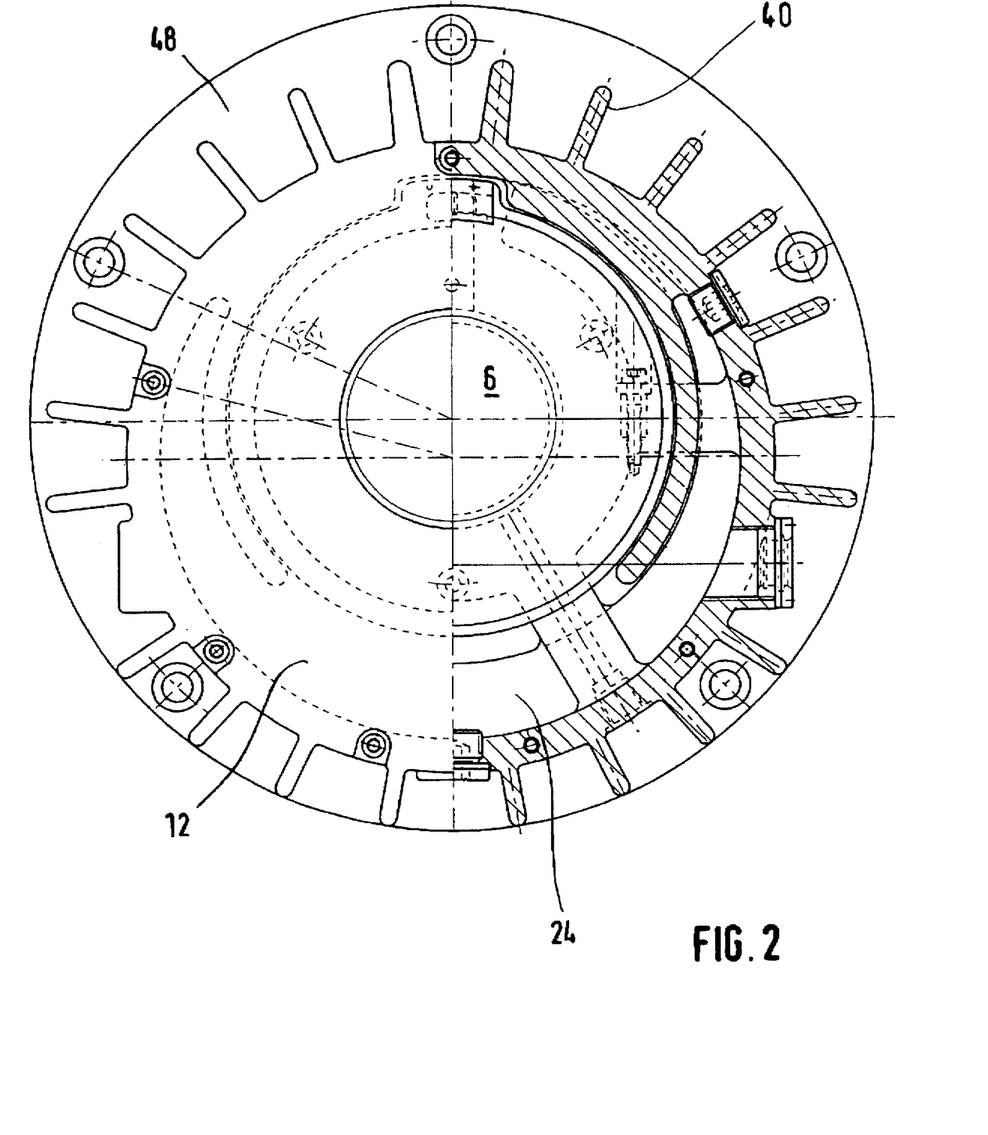
FIG. 2 a front view of the radial friction bearing according to FIG. 1 without a cowling and without a fan wheel in partial section.

FIGS. 1 and 2 depict a radial friction bearing 1 according to a first embodiment of the invention such as is used in electric machines and in particular for the bearing of the rotor of electric motors. The radial friction bearing 1 comprises a bearing housing 2, a fixed lubrication ring 4 fastened coaxially with it on a shaft 6, and a bearing shell 8 disposed within the bearing housing 2, in which the shaft 6 is rotatably supported. According to another embodiment it is also possible to provide several fixed lubrication rings 4.

The bearing housing 2 comprises two parts and a radial joining plane 10 and it comprises a bearing cover 12 and a housing body 14. The shaft 6 is continuous and projects through the bearing cover 12 and the housing body 14. The bearing cover 12 and the housing body 14 are sealed against the shaft 6 through conventional felt rings 16. The fixed lubrication ring 4 is divided and placed into an encircling radial groove 18 of shaft 6 and there connected rigidly with it. The fixed lubrication ring 4 can be removed form shaft 6 after the bearing cover 12 has been removed from the housing body 14.

The bearing shell is a thin-walled bearing shell 8 which is placed, for example pressed, into the housing body 14 in such a way that it cannot rotate relative to the housing body 14. The thin-walled bearing shell 8 can be secured in the housing body 14 with a setpin. The thin-walled bearing shell 8 is known from automobile construction and comprises preferably a radially outer support shell, preferably comprising sheet steel, and a radially inner bearing metal layer forming a bearing surface 20 for the shaft 6. According to a further embodiment the thin-walled bearing shell 8 can comprise another material with or without bearing metal layer. The thin-walled bearing shell 8 can be divided or undivided, it is preferably undivided. The dimensions of the thin-walled bearing shell 8 correlate with the constructional size of the bearing. In the present embodiment example the thin-walled bearing shell 8 has an outer diameter of 80 mm at a shaft diameter of 75 mm, which results in a radial thickness of 2.5 mm for the thin-walled bearing shell 8 and the bearing metal layer is 0.3 mm thick. But bearing shells thinner than 2.5 mm are also possible. The ratio of the outer diameter of the bearing shell to the shaft diameter is preferably in the range between 1.02 and 1.08, preferably 1.067, and the ratio of the shaft diameter to the radial thickness of the thin-walled bearing shell is correspondingly approximately 30. The bearing metal layer forms the bearing surface 20 for shaft 6 and it comprises preferably a known bearing material, for example antifriction metal. But the bearing metal layer can instead also comprise several layers of different bearing metals.

The radial bearing 1 is preferably a horizontal bearing, i.e. the center axis 22 of the shaft 6 is disposed in a horizontal plane. Since the fixed lubrication ring 4 is rigidly connected with shaft 6, it rotates with it and delivers in known manner oils from a crankcase sump 24 which is disposed in the lower half of the bearing housing 2. In the upper half of the bearing cover 12 is disposed an oil wiper 26 which wipes oil from the radially outer circumferential face of the fixed lubrication ring 4. Directly adjacent to the oil wiper 26 is disposed in the housing body 14 an inlet opening 28 of an oil channel 30 and a large portion of the oil wiped from the fixed lubrication ring 4 flows into the oil channel 30 which terminates in an oil bore 32 in the thin-walled bearing shell 8 so that the oil wiped off by the oil wiper 26 lubricates the bearing surface 20 of the thin-walled bearing shell 8. The inlet opening 28 of the oil channel 30 is disposed essentially in the radial joining plane 10 of the bearing housing 2 and is higher than the oil bore 32 in the thin-walled bearing shell 8 so that the oil in the oil channel 30 flows downward due to its own weight. The thin-walled bearing shell 8 can be comprised of two or more thin-walled bearing shell elements disposed axially at intervals, between which the oil channel 30 terminates. Consequently, the oil bore 32 becomes superfluous.

In the bearing housing 2 a closed lubrication ring chamber 34 is provided which contains the crankcase sump 24 in the lower part. The side walls pointing in the axial direction of the lubrication ring chamber 34 are partially formed by two chambering metal sheets, a first chambering sheet 36 and a second chambering sheet 38, which encompass in the form of a sandwich the fixed lubrication ring 4 in the axial direction. The first chambering sheet 36 is disposed essentially in the radial joining plane 10 of the bearing housing 2 and is screwed securely to the housing body 14; the second chambering sheet 38 is screwed securely parallel to the first chambering sheet 36 on the bearing cover 12. The circumferential walls of the lubrication ring chamber 34 are formed by the bearing housing 2, in particular by the bearing cover 12. The two chambering sheets 36, 38 have a small axial distance from the fixed lubrication ring 4 so that oil spattering from the fixed lubrication ring 4 and/or wiped off remains within the lubrication ring chamber 34 or flows into the oil channel 30.

The lubrication ring chamber 34 is to a great extent disposed within the bearing cover 12 which greatly simplifies the mounting and dismounting of the chambering sheets 36, 38, of the oil wiper 26 and of the fixed lubrication ring 4 and consequently makes them more cost-effective. For dismounting the radial friction bearing 1, first, the bearing cover 12 together with the oil wiper 26 and the second chambering sheet 38 is pulled from the housing body 14 and from the shaft 6 in the axial direction. Subsequently, the fixed lubrication ring 4 is detached from shaft 6. Subsequently, the first chambering sheet 36 can be unscrewed from the housing body 14.

The housing body 14 as well as also the bearing cover 12 comprise at their radially outer circumferential faces cooling fins 40 which enhance heat transfer from the radial friction bearing 1 to the environment. A fan wheel 42 is disposed outside of the bearing cover 12, in the proximity of the bearing cover outlet opening for the shaft 6, coaxially on shaft 6 and connected with it so as to be torsion-tight. The fan wheel 42 generates a cooling air stream 44 for cooling the radial friction bearing 1. The cooling air stream 44 is directed by an air stream guide body 46 past the cooling fins 40 and subsequently away from the radial friction bearing 1 radially outwardly. The air stream guide body 46 has preferably the form of a pot-shaped cowling which encompasses the cooling fins 40 of the bearing housing 2 and the fan wheel 42, and is secured on a radially outer encircling flange 48 of the housing body 14. Shaft 6 projects through a center shaft opening of the cowling 46.

The cowling 46 comprises at its front-face cowling wall air inlet openings 50 for drawing in cooling air and in its cowling circumferential wall air outlet openings 52 to give off cooling air heated by the radial friction bearing 1. Between the bearing cover 12 and the fan wheel 42 is disposed a labyrinth seal 54 so that the penetration of cooling air of the cooling air stream 44 into the bearing housing 2 is prevented. In the front view of FIG. 2 the cowling 46 and the fan wheel 42 are not shown.

In the first embodiment according to FIG. 1 and FIG. 2 the radial friction bearing 1 is a fixed bearing and on the faces of the two chambering sheets 36, 38 oriented toward the fixed lubrication ring 4, one lubrication ring stop face 56 each is disposed. The two lubrication ring stop faces 56 together form with the front faces oriented in the axial direction of the fixed lubrication ring 4 an axial bearing with low axial play limiting the axial movement of the fixed lubrication ring 4. Since the fixed lubrication ring 4 is secured axially in the shaft 6 through the encircling radial groove 18, it can transmit the axial forces from the shaft 6 to the lubrication ring stop faces 56. The forces acting upon the rotor of electric motors are, as a rule, relatively small so that an axial bearing through the fixed lubrication ring 4 is sufficient. Instead of two lubrication ring stop faces 56 according to a further embodiment, also only one lubrication ring stop face could be provided if the shaft 6 is only on one side axially loaded. Through the functional combination of functions "lubrication oil delivery" and "axial bearing" in one structural part, additionally production costs for the radial friction bearing 1 are saved.

Figure 3:
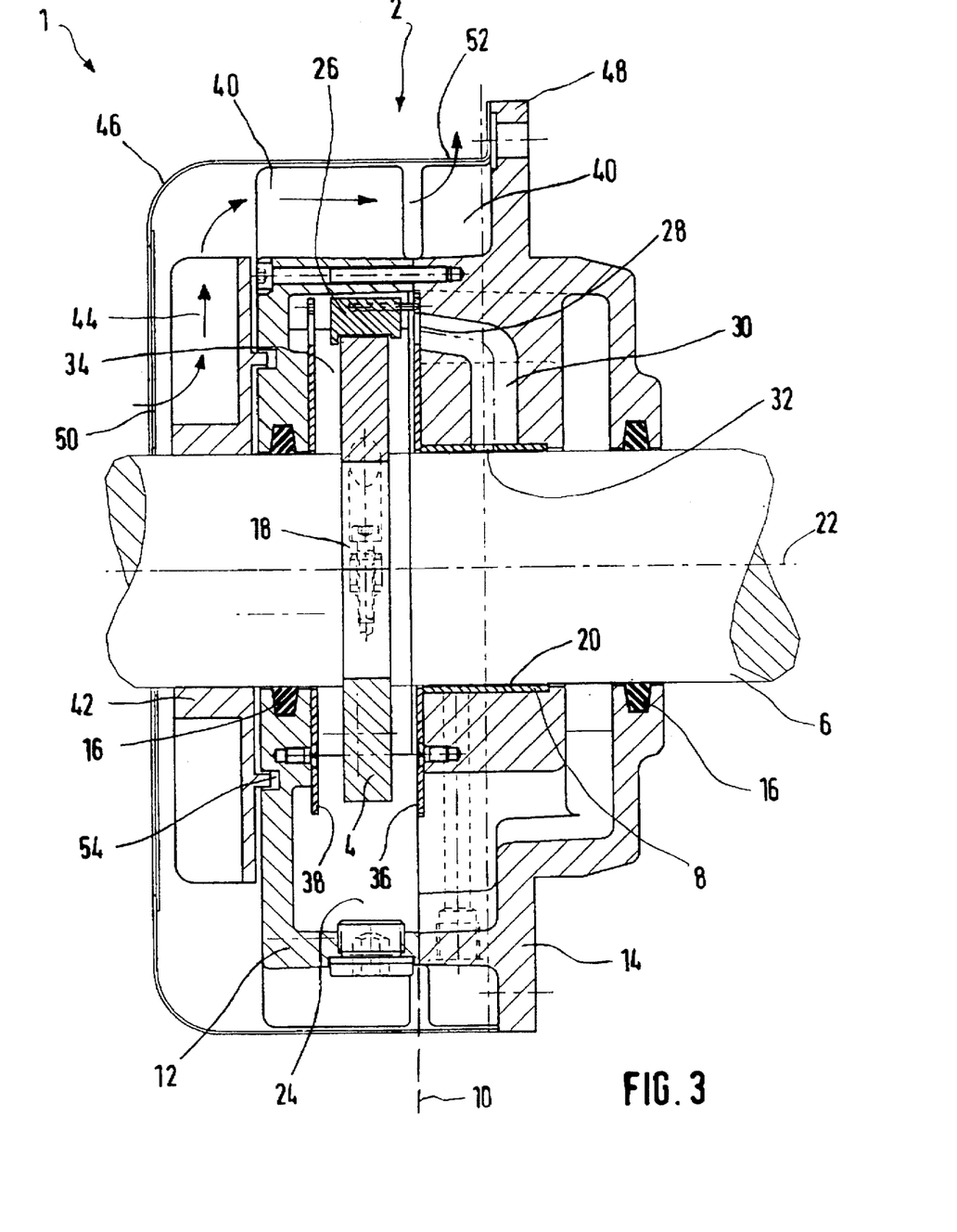
FIG. 3 an axial section of a radial friction bearing according to a second embodiment of the invention.

A second embodiment of the invention is depicted in FIG. 3. The sole difference between it and the radial friction bearing 1 of FIG. 1 is that it is a movable bearing and that therefore no lubrication ring stop faces 56 for the fixed lubrication ring 4 are present.

Figure 4:
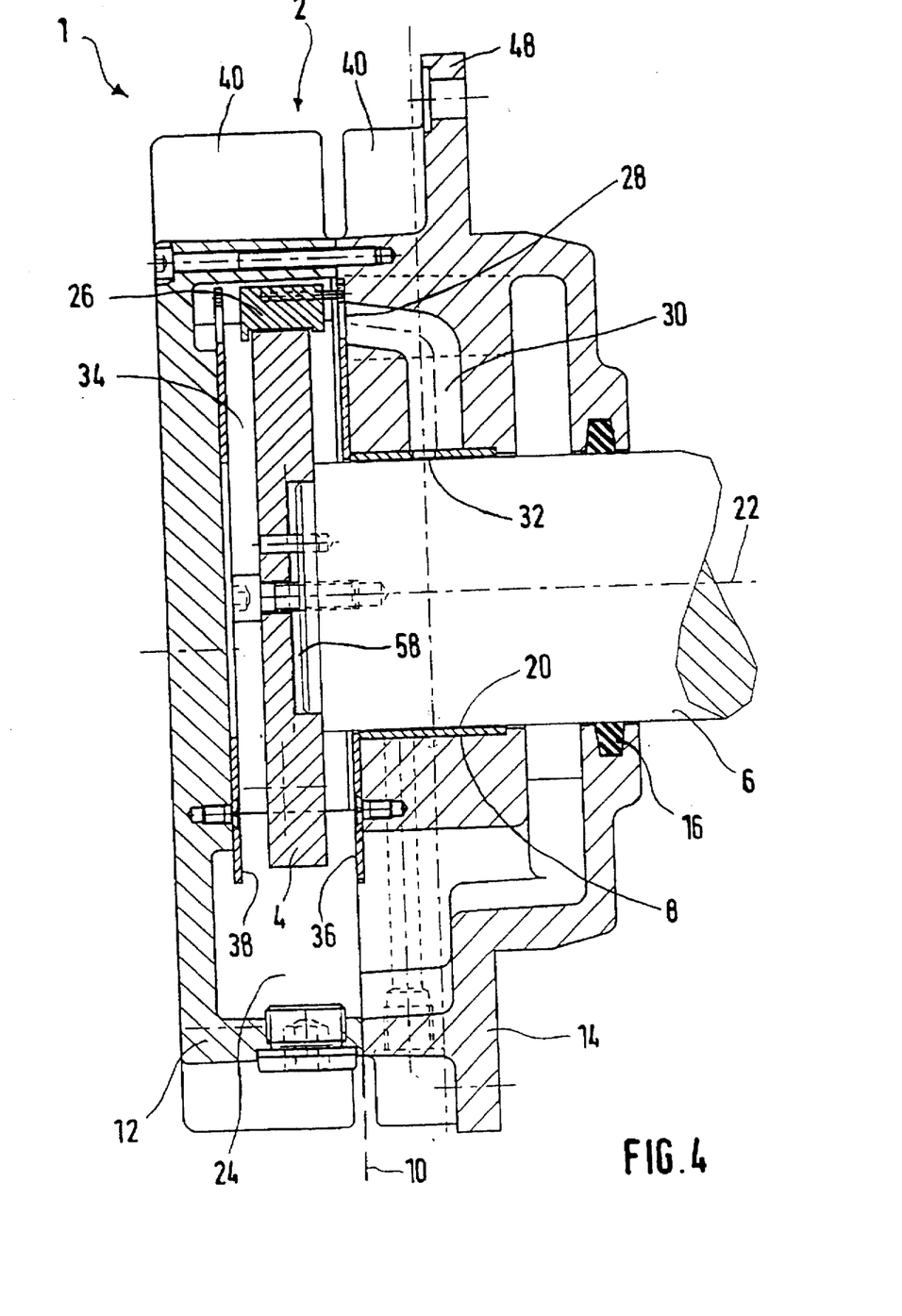
FIG. 4 an axial section of a radial friction bearing according to a third embodiment of the invention.

In FIG. 4 a third embodiment according to the invention is shown. This is a movable bearing for a shaft end and no fan wheel 42 is provided and the fixed lubrication ring 4 is secured on the free front face 58 of shaft 6 coaxially with it.

The radial friction bearing according to the embodiments of FIG. 3 and FIG. 4 are supplied with oil or cooled, respectively, in the same manner as the embodiment according to FIG. 1 so that for corresponding parts identical reference numbers are used as in FIG. 1.

Figure 5:
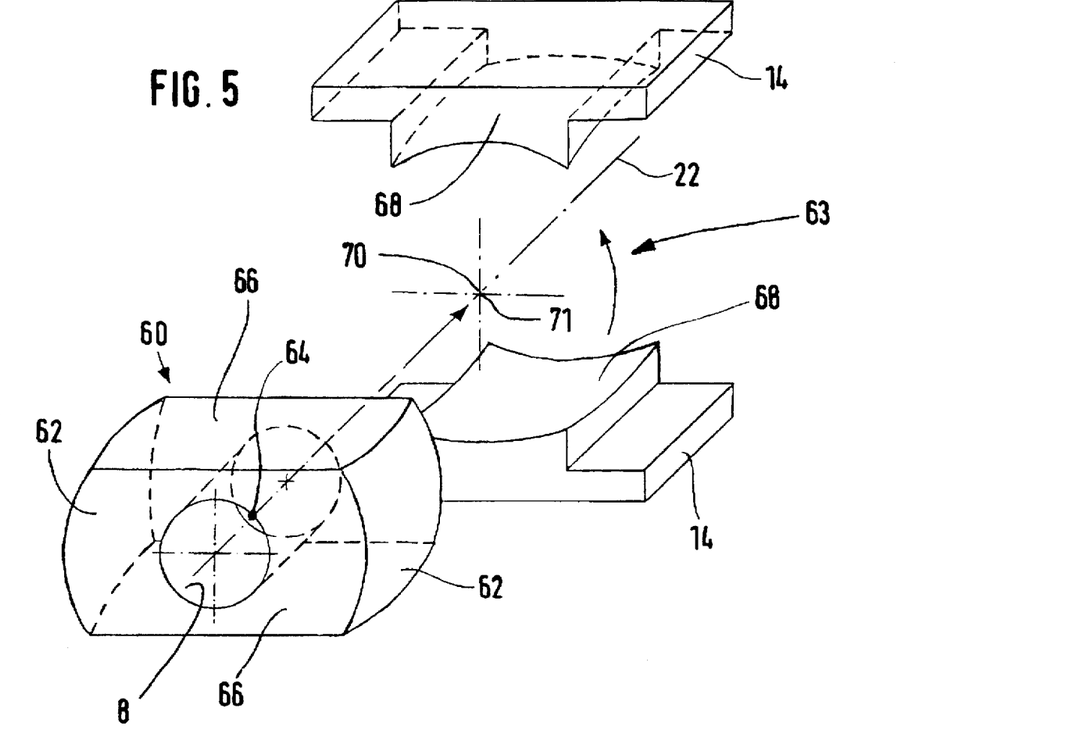
FIG. 5 a schematically perspective exploded representation of a radial friction bearing according to a fourth embodiment of the invention with a shell carrier before mounting.
Figure 6:
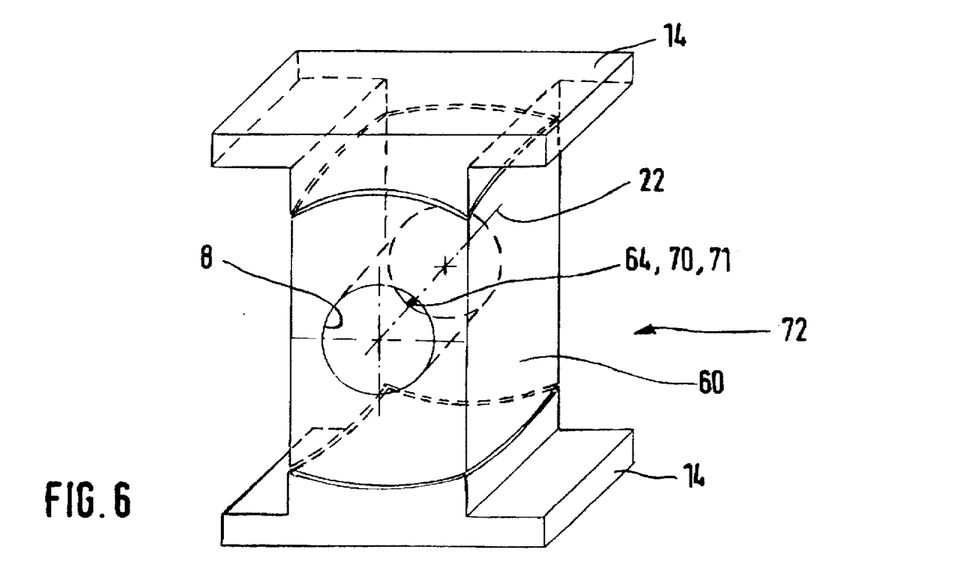
FIG. 6 a perspective representation of the radial friction bearing of FIG. 5 with the shell carrier mounted.

In the embodiment according to FIG. 5 and FIG. 6 the bearing shell 8 is borne by a shell carrier 60 whose peripheral face is formed by a spherical outer face of a first theoretical sphere and the spherical outer face comprises two peripheral flattenings 66 which, in the present case, are parallel with respect to one another. Of the spherical outer face of the shell carrier two spherical outer face sections 62 remain which are directed diametrically away from one another.

A portion of the inner surface of the schematic housing body 14 is formed by a spherical inner surface of a second theoretical sphere which for a ball bearing has a slightly greater diameter than the first theoretical sphere. The spherical inner surface comprises at least one cutout 63 such that of the spherical inner surface of the housing bearing 14 remain spherical inner face sections 68 which are disposed opposingly.

The height of the shell carrier 60 is smaller over its pheripheral flattenings 66 than the height of the cutouts 63 such that the shell carrier 60 can be emplaced through one of the cutouts 63 into the spherical inner surface of the housing body 14 and the center point 64 of the first theoretical sphere and subsequently the center point 70 of the second theoretical sphere coincide in a common pivot 71 on the center axis 22 of shaft 6.

According to FIG. 5 the shell carrier 60 is slid in coaxially to the center axis 22 of shaft 6 into the housing body 14. The shell carrier 60 is oriented so that the two spherical outer face sections 62 of the shell carrier 60 are rotated by 90 degrees relative to the two spherical inner face sections 68 of the housing body 14.

After the shell carrier 60 has been set into the housing body 14, it is subsequently pivoted relative to the housing body 14 by 90 degrees about the common pivot point 71 so that the spherical outer face sections 62 of the shell carrier 14 overlap the spherical inner face sections 68 of the housing body 14 and are slidably in contact with one another. The spherical outer face sections 62 and the spherical inner face sections 68 subsequently form a partial ball-and-socket joint 72 with pivot point 71 with the aid of which a known manner angle errors of shaft 6 relative to the radial friction bearing 1 can be compensated. Only through the special forming of the shell carrier 60 and of the housing body 14 is it possible to accommodate the ball-and-socket joint 72 in the housing body 14 since the housing body 14 is undivided.

Figure 7:
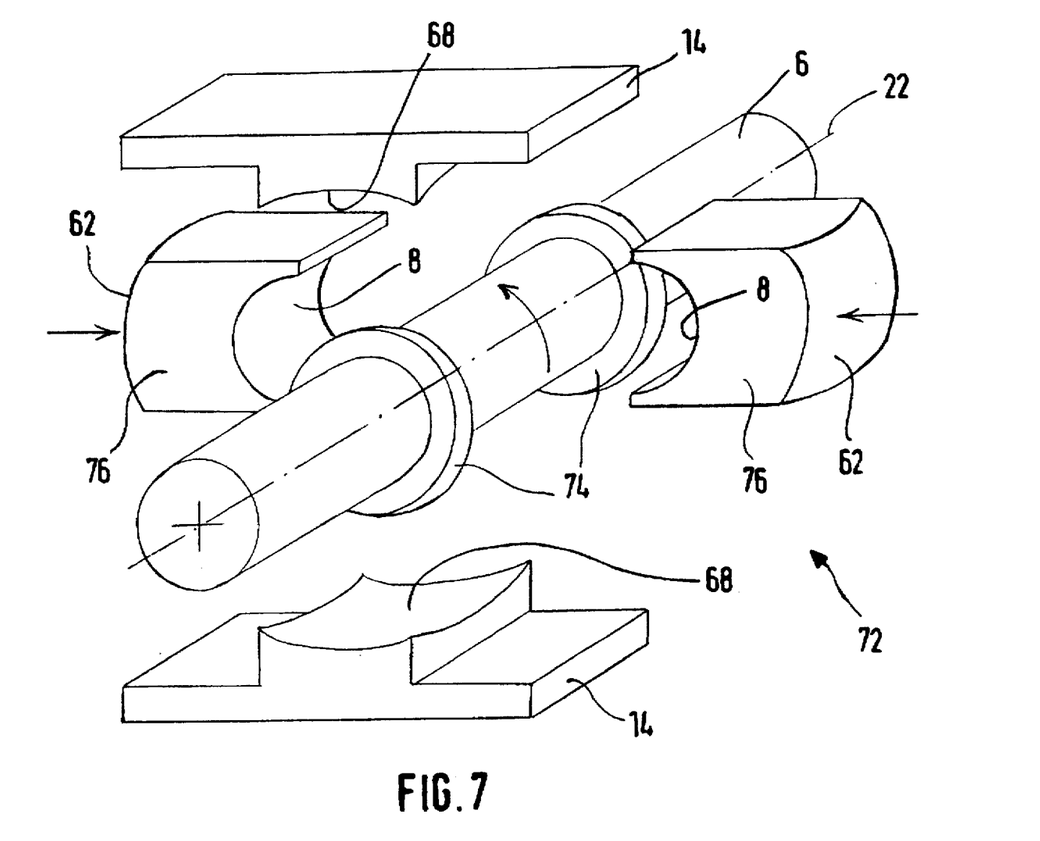
FIG. 7 a perspective representation of a radial friction bearing according to a fifth embodiment of the invention.

The embodiment shown in FIG. 7 differs from the one shown in FIG. 5 and FIG. 6 thereby that the shaft 6 comprises two shaft collars 74 which can also serve as fixed lubrication rings in order to deliver oil onto the bearing surfaces 20 of the bearing shell 8.

The shaft collars 74 and the shaft 6 are preferably realized integrally as one body, but they can also separate parts. While in the embodiment according to FIG. 5 and FIG. 6 the shaft is slid into the bearing shell 8 of the shell carrier 60, this is not possible in the case of the embodiment according to FIG. 7 due to the shaft collars 74. The shell carrier which otherwise corresponds to the shell carrier 60 of FIG. 5 and FIG. 6, is therefore divided in an axial parting plane containing the center axis 22 of the shaft 6 into two shell carrier halves 76. These two shell carrier halves 76 are during the mounting of the partial ball-and-socket joint 72 first between the two shaft collars 74 on the shaft 6 and connected one with the other. The shaft 6 together with the joined shell carrier halves 76 according to FIG. 5 are subsequently placed into the housing body 14 and rotated by 90 degrees about the center axis 22 of shaft 6 so that the corresponding spherical surface sections oppose one another.

The spherical surfaces 62, 68 forming the ball-and-socket joint 72 can remain angularly movable with respect to one another during operation of the radial friction bearing 1. In the preferred embodiment, however, after mounting the shell carrier 60 in the bearing housing 2, the shell carrier 60 is fixed in a given angular position relative to the bearing housing 2 and the ball-and-socket joint 72 blocked thereby that, for example, the spherical outer surface sections 62 of the shell carrier 60 is clamped against the spherical inner surface sections 68 of the housing body 14 with the aid of positioning and tightening screws.

We claim:

1. A journal bearing (1) comprising a bearing housing (2), at least one fixed lubrication ring (4) secured coaxially on a shaft (6), and at least one bearing shell (8) disposed within the bearing housing (2) in which the shaft (6) is rotatably supported, the bearing housing (2) including a radial jointing plane (10), a sump (24) and a lubrication ring chamber (34), the fixed lubrication ring extending into the sump (24), the fixed lubrication ring drawing oil from the sump (24), the fixed lubrication ring (4) being in contact with an oil wiper (26), the wiper wiping oil from the fixed lubrication ring (4) into an oil channel, the oil channel connecting the oil wiper (26) with a bearing surface (20) of the bearing shell (8), whereby oil wiped by the oil wiper (26) lubricates the bearing surface (20) of the bearing shell (8), the lubrication ring chamber (34) being defined by chamber walls (36, 38) whereby oil spattered from the fixed lubrication ring (4) and/or wiped by the oil wiper (26) remains within the lubrication ring chamber (34) or flows into the oil channel (30), the bearing shell (8) comprising a thin-walled bearing shell having a ratio of bearing shell outer diameter to the diameter of the shaft (6) in the range between 1.02 and 1.08.

2. A journal bearing constructed in accordance with claim 1, wherein the bearing housing (2) comprises a bearing cover (12) and a housing body (14), which are fastened one to the other in the radial jointing plane (10), the fixed lubrication ring (4) being disposed within the bearing cover (12) and the thin-walled bearing shell (8) being disposed within the housing body (14).

3. A journal bearing constructed in accordance with claim 1, wherein the bearing housing (2) comprises at its outer surface cooling fins (40) which enhance the heat transmission from the radial friction bearing (1) to the environment.

4. A journal bearing constructed in accordance with claim 1, further including a fan wheel (42) for generating a cooling air stream (44), the fan wheel (42) being connected to the shaft (6) so as to be torsion tight, the fan wheel (42) being positioned outside the bearing housing (2), an air stream guide body (46) being secured on the bearing housing (2), the guide body (46) directing the cooling air stream (44) over outer surfaces of the bearing housing (2).

5. A journal bearing as constructed in accordance with claim 4 wherein the bearing housing includes cooling fins (40) on its outer surface, the air stream guide body comprising a pot-shaped cowling (46) encompassing the cooling fins (40) of the bearing housing (2), the cowling including air inlet openings (50) for drawing in cooling air and air outlet openings (52) for giving off air heated by the journal bearing (1).

6. A journal bearing constructed in accordance with claim 4, further including a labyrinth seal (54), the seal (54) being positioned between the bearing housing (2) and the fan wheel (42) whereby the penetration of cooling air of the cooling air stream (44) into the bearing housing (2) is prevented.

7. A journal bearing constructed in accordance with claim 1, wherein the bearing is fixed and the bearing housing (2) includes lubrication ring stop faces (56) acting in the axial direction which form an axial bearing and limit the axial movability of the fixed lubrication ring (4).

8. A journal bearing as constructed in accordance with claim 1, wherein the bearing shell (8) is undivided and is pressed into the bearing housing (2), and is comprised at least of one radially outer support layer of sheet steel and a radially inner bearing metal layer which forms a bearing surface (20) for the shaft (6).

9. A journal bearing as stated in claim 1, characterized in that the bearing shell (8) is borne by a shell carrier (60) whose peripheral surface is formed by a spherical outer surface (62) which comprises at least one peripheral flattening (66), and that a portion of the inner surface of a portion of the bearing housing (2) is formed by a spherical inner surface (68) which comprises at least one cutout (63) and that the height of the shell carrier (60) over its peripheral flattening (66) is smaller than the height of the at least one cutout (63) such that the shell carrier (60) can be placed through the cutout (63) into the spherical inner surface (68) of the housing body (14), and that the shell carrier (60) subsequently can be pivoted relative to the housing body (14) about a common pivot point (71) such that the spherical outer surface (62) of the shell carrier (60) is slidably in contact on the spherical inner surface (68) of the housing body (14) and together with it forms a ball-and-socket joint (72) and the sphere center point (64) of the sphere outer surface (62) and the sphere center point (70) of the sphere inner surface (68) coincide in the pivot point (71) of the ball-and-socket joint (72).

10. A journal bearing as constructed in accordance with claim 1 wherein the chamber walls (36, 38) are parallel to one another and lie in radial planes, the fixed lubrication ring including a pair of opposed planar axial faces, the lubrication ring axial faces being parallel to the chamber walls.

11. A lubricated journal bearing comprising a bearing housing, at least one fixed lubrication ring secured coaxially on a shaft and at least one bearing shell disposed within the bearing housing in which the shaft is rotatably supported, the bearing housing including a radial jointing plane, the bearing being fixed and the bearing housing including stop faces, the fixed lubrication ring including axial faces, at least one of the stop faces abutting a lubrication ring axial face to form an axial bearing limiting the axial movement of the fixed lubrication ring.

12. A lubricated journal bearing as constructed in accordance with claim 11 wherein the ratio of bearing shell outer diameter to the shaft diameter is in the range of between 1.02 and 1.08.

13. A lubricated journal bearing constructed in accordance with claim 11 wherein the bearing housing includes a sump, the lubrication ring extending into the sump, the lubrication ring drawing oil from the sump, an oil wiper, the oil wiper being in contact with the lubrication ring, whereby oil carried on the fixed lubrication ring from the sump is wiped, the housing further including an oil channel connecting the oil wiper and a bearing surface of the bearing shell, the wiped oil being conveyed into the channel, the channel conveying the wiped oil to the bearing surface.

14. A lubricated journal bearing comprising a bearing housing, at least one lubrication ring fixed coaxially on a shaft and at least one thin walled bearing shell disposed within the bearing housing in which the shaft is rotatably supported, the bearing housing including a radial jointing plane, the bearing shell being carried in a shell carrier, the peripheral surface of the shell carrier being formed by a spherical outer surface, the spherical outer surface including at least one peripheral flattened portion, a portion of the inner surface of the bearing housing being formed by a spherical inner surface which comprises at least one cut-out, the height of the shell carrier at the flattened portion being less than the height of the at least one cut-out such that the shell carrier can be placed through the cut-outs into the spherical inner surface of the housing body and the shell carrier can be subsequently rotated relative to the housing body about a common pivot point such that the spherical outer surface of the shell carrier is slidably in contact with the spherical inner surface of the housing body and forms a ball and socket joint and with the center of the spherical outer surface and the center of the spherical inner surface coinciding with the pivot center of the ball and socket joint.

15. A lubricated journal bearing comprising a bearing housing, at least one lubrication ring fixed coaxially on a shaft and at least one bearing shell disposed within the bearing housing in which the shaft is rotatably supported, the bearing housing including a radial jointing plane, a fan wheel for generating a cooling air stream, the fan wheel being connected to the shaft for unitary rotation therewith, the fan wheel being positioned outside the bearing housing, an air stream guide body being secured on the bearing housing, the fan wheel generating a cooling air stream and a labyrinth seal being positioned between the bearing housing and the fan wheel, whereby the air stream is prevented from penetrating the bearing housing.

16. A lubricated journal bearing as constructed in accordance with claim 15 wherein the air stream guide body comprises a pot shaped cowling, the bearing housing including external cooling fins, the cowling extending over the cooling fins, the cowling including air inlet openings for drawing cooling air and air outlet openings for exhausting air heated by the bearing.

* * * * *